July 1, 1958     C. P. McCLELLAND     2,840,844
WINDSHIELD WIPER TRANSMISSION CABLE TENSIONING APPARATUS
Filed April 27, 1953     2 Sheets-Sheet 1

INVENTOR
Clarence P. McClelland
BY
Willits, Helwig & Baillio
ATTORNEYS

July 1, 1958 C. P. McCLELLAND 2,840,844
WINDSHIELD WIPER TRANSMISSION CABLE TENSIONING APPARATUS
Filed April 27, 1953 2 Sheets-Sheet 2

INVENTOR
Clarence P. McClelland
BY
Willits, Helmig & Baillio
ATTORNEYS

United States Patent Office 2,840,844
Patented July 1, 1958

2,840,844

WINDSHIELD WIPER TRANSMISSION CABLE TENSIONING APPARATUS

Clarence P. McClelland, Royal Oak, Mich., assignor to General Motors Corporation, Detroit, Mich., a corporation of Delaware Application April 27, 1953, Serial No. 351,070

9 Claims. (Cl. 15—253)

This invention relates to windshield wiper apparatus, and more particularly to apparatus providing improved means for adjusting the cable transmitting means and wiper arm.

One feature of the invention is that it provides improved windshield wiper apparatus; another feature of the invention is that it provides for adjustment of the wiper blades in very small increments or steps; another feature of the invention is that it includes apparatus providing improved means for adjusting the cable transmitting means and wiper arm; a further feature of the invention is that it provides a single means for adjusting, in one operation, the windshield wiper cable tension and the angular position of the wiper arm; still another feature is that the adjusting means is operable from outside the automobile body; and yet a further feature of the invention is that it provides an improved means for securing the windshield wiper arm to the wiper operating shaft.

Other features and advantages of the invention will be apparent from the following description and from the drawings, in which.

Figure 1:
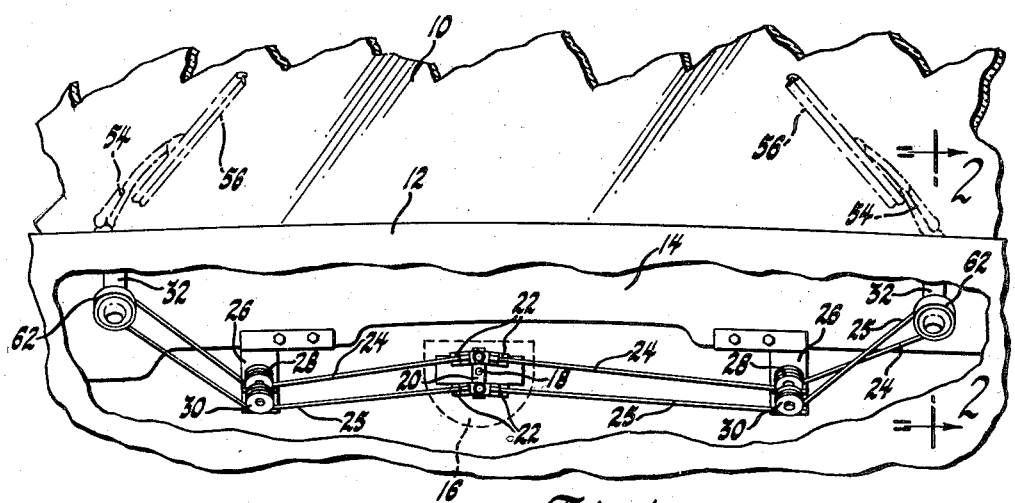
Fig. 1 is a fragmentary elevational view of the dash panel and windshield of an automobile, parts of the dash panel being broken away to show underlying structure.

In my co-pending application filed November 17, 1950 as Serial No. 196,268, now Patent 2,660,894, issued December 1, 1953, and entitled "Windshield Wiper Drive Apparatus," I disclosed and claimed a novel and improved drive means including a pair of pulleys mounted on the wiper operating shaft and connected by means of cables to the wiper motor. One of the pulleys is fixed to the operating shaft and the other is rotatable thereon, and the pulleys are interconnected by spring means so that when the rotatable pulley is clamped to the fixed pulley the cables make a driving connection with the operating shaft. In the event either or both of the cables becomes slack, the pulleys may be loosened to cause relative rotation between the pulleys under the influence of the spring means to tighten the cables. In the structure shown in the above patent, the adjusting means is on the inside of the automobile body so that it is necessary to obtain access underneath the dash panel in order to adjust the cable tension. Furthermore, in all known prior art devices, adjustment of the radial angle of the wiper blade on the wiper operating shaft is made by means of complementary serrations on the blade supporting arm and the output shaft, in a manner similar to the means for adjusting a conventional water faucet handle on its valve shaft. Since the wiper operating shaft is of small diameter, the angle between each of the serrations is large in these prior art devices, and the adjustment of the blade is in coarse steps. Consequently, it is often impossible to adjust both blades in proper "park" positions, and it is often impossible to obtain perfect symmetrical operation of the two blades.

In this application I am disclosing and claiming improved windshield wiper apparatus wherein a single adjustment, which is made from outside the automobile body, is operable to tighten the cables and to permit very fine adjustment of the angular position of the windshield wiper arm so that the wiper arm is in the proper "park" position when it is not in operation and so that the wiper covers the desired windshield area during operation and operates symmetrically with the wiper on the other side of the windshield. The invention also includes a novel means for securing the wiper arm nonrotatably on the wiper operating shaft.

Referring now more particularly to the drawings, windshield wiper apparatus incorporating the invention is illustrated as being installed in an automobile having a windshield 10 which is mounted in a cushioning and sealing member 11 above a dash panel 12 and body firewall 14. Part of the dash panel is broken away in Fig. 1 to illustrate the windshield wiper drive apparatus. Each side of the windshield is provided with a separate wiper and with separate transmission mechanisms, and inasmuch as the apparatus at each side is similar, only one will be described in detail. Duplicate parts at the other side of the windshield will be designated by the same reference characters as those used to designate the parts being described.

A windshield wiper motor 16, which may be of the conventional oscillating type, is mounted near the transverse center of the vehicle on the firewall 14. A motor shaft 18 extends from the motor through the firewall to the inside of the automobile body and carries at its rear end a rocker arm 20 which, at its opposite ends, pivotally mounts connecting fingers 22 which, if desired, may include spring means for yieldably holding the cables taut during operation of the windshield wiper. The construction and operation of the motor 16 and the members 20 and 22 is conventional and is well known in the art. Patent 2,660,894 shows this structure in greater detail, and reference may be had to said patent for a more detailed description of this apparatus if desired.

As shown in Fig. 1, at each side of the automobile cables 24 and 25 extend from the respective fingers 22 to the wiper apparatus, the cables on one side being crossed to provide for reverse operation of the wipers at opposite sides of the automobile. At each side of the center of the car a bracket 26 is bolted to the firewall 14 and supports idler pulleys 28 and 30, the cable 24 passing over idler pulley 28 and the cable 25 passing over idler pulley 30.

Figure 2:
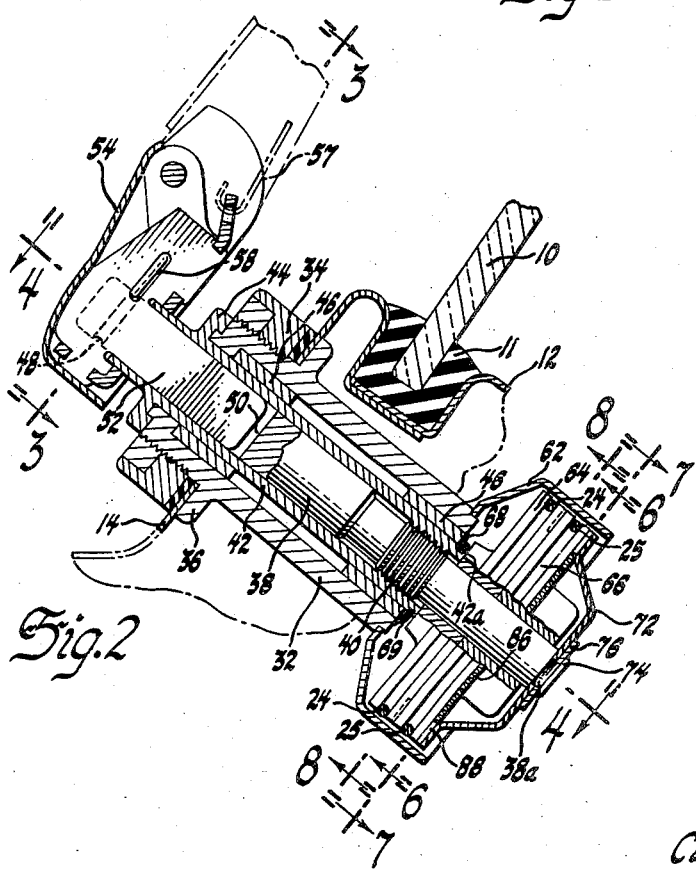
Fig. 2 is an enlarged sectional view taken along the line 2—2 of Fig. 1.

Referring now more particularly to Fig. 2, the wiper operating apparatus is supported in a bearing sleeve 32 which is fixedly mounted on the automobile firewall 14.

by means of a nut 34 which is threaded on the forward end of the bearing sleeve 32. The sleeve has an integral shoulder portion 36, and the body firewall 14 is clamped between the shoulder 36 and the nut 34, the sleeve 32 extending from the inside of the automobile body to the outside thereof. Extending through sleeve 32, and projecting from both ends thereof, is a wiper operating shaft 38 having a threaded portion 40. Shaft 38 is carried in a locking sleeve 42 which has a complementary threaded portion engaging the threads 40 of the shaft 38. Locking sleeve 42 extends forwardly beyond the forward end of bearing sleeve 32 and has an integral nut portion 44 which serves as an adjusting means to move the shaft 38 axially relative to sleeve 42. As shown in Fig. 2, the inner face of the nut 44 bears against the outer face of the bearing sleeve 32 and bearings 46 between sleeves 32 and 42 provide a rotatable mounting for sleeve 42 within sleeve 32.

Figure 3:
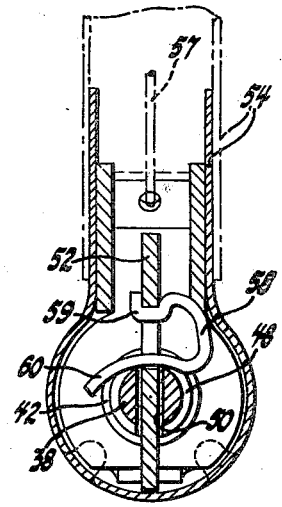
Fig. 3 is a section through the wiper arm taken along the line 3—3 of Fig. 2.
Figure 4:
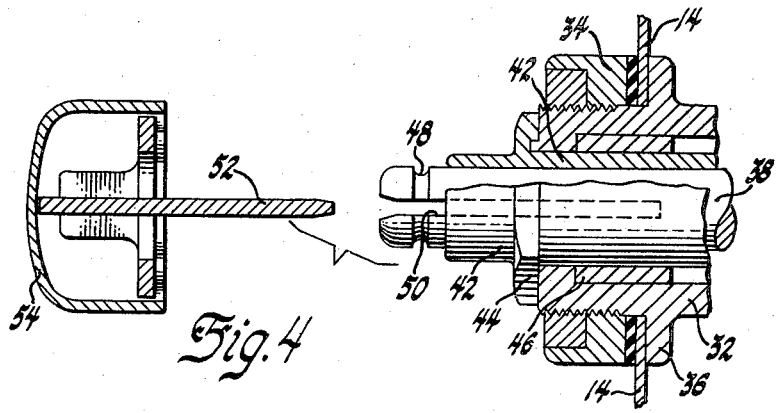
Fig. 4 is a longitudinal section through a portion of the wiper operating shaft taken along the line 4—4 of Fig. 2, the wiper arm being shown removed from the operating shaft.

As shown best in Figs. 2, 3 and 4, the outer end of shaft 38 is provided with a peripheral groove 48 and said shaft has an axially extending slot 50 adapted to receive a key 52 which projects from a wiper arm 54. The free end of the arm 54 carries a conventional wiper blade 56 which is adapted to engage the outer surface of the windshield 10 when the wiper arm 54 is mounted on the shaft 38, a spring 57 urging the free end of the arm 54 and the blade 56 into engagement with the outer surface of the windshield. A novel, readily releasable, but non-rotatable mounting means is provided for the arm 54 by engagement of the key 52 in the slot 50, and by a clip spring 58 which has one end 59 hooked into the wiper arm, as shown in Fig. 3, and which has at its other end a curved portion 60 adapted to snap into the groove 48. The interengagement of the key 52 and slot 50 prevents relative rotation between shaft 38 and arm 54, and the spring clip 58 provides a readily releasable means for holding the arm 54 on the shaft 38.

At the inner end of the bearing sleeve 32 is mounted a cup member 62 which forms a housing for drive pulleys 64 and 66. As shown in Fig. 2, the locking sleeve 42 has a peripheral groove near its inner end in which is mounted a spring washer 68, a retaining washer 69 being provided in said groove to provide a bearing surface for the spring washer 68. The washer 68 keeps dirt away from the bearings 46. The inner end 42a (Fig. 2) of sleeve 42 is adapted to abut the adjacent face of pulley 64.

Both of the drive pulleys 64 and 66 are rotatably mounted on the shaft 38 within the housing 62, the pulleys being held on the shaft by means of a pressure disk 72 which is mounted on a flattened portion 38a at the rear end of the shaft. The rear end of the shaft 38 is peened as shown at 74 (Fig. 2), and a washer 76 is mounted between the pressure disk 72 and the peened end 74 of the shaft 38.

Figure 6:
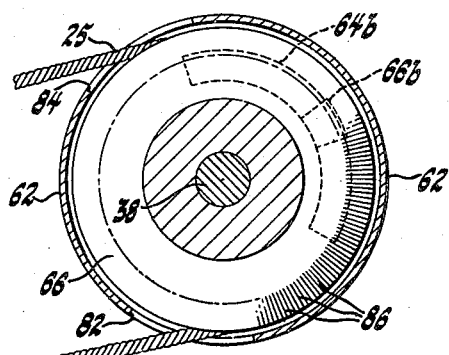
Fig. 6 is a section taken along the line 6—6 of Fig. 2 showing one face of the pulley means.
Figure 7:
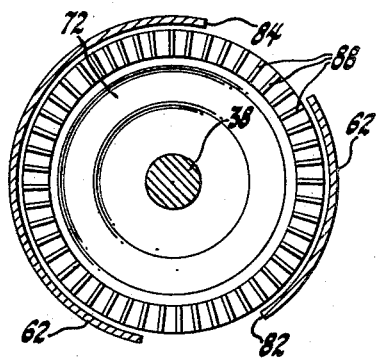
Fig. 7 is a section taken along the line 7—7 of Fig. 2 and showing the complementary face of the pressure means; and, Fig. 8 is a section through the pulley means taken along the line 8—8 of Fig. 2.
Figure 8:
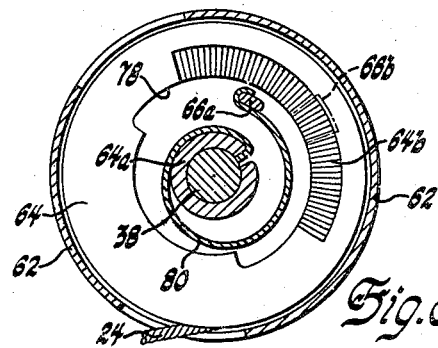

The pulleys 64 and 66 are similar to the structure shown in my copending application mentioned above, and are provided with complementary recesses in their abutting surfaces forming a chamber as shown at 78 in Fig. 8. Within this chamber is a coil spring 80 having one end connected to the hub portion 64a of the pulley 64 and the other end connected to an ear 66a which projects from pulley 66 into chamber 78. As shown in Figs. 6 and 8, the abutting pulley faces bear serrations 64b and 66b to provide a good frictional lock between the pulleys. The drive cable 24 extends through an opening 82 in housing 62 and is secured to pulley 64 and cable 25 extends through an opening 84 in housing 62 and is secured to pulley 66.

When the drive apparatus, including the cables 24 and 25, is mounted in the automobile the pulleys 64 and 66 are rotated relative to each other so that energy is stored in the spring 80. After the initial installation has been made, the pulleys are locked to each other and to the shaft 38 so that the shaft 38 may be oscillated to operate the wipers. Should the cables become slack at any time after the initial installations, they may be tightened by loosening the pulleys on the shaft, so that the pulleys rotate relative to each other and relative to the shaft under the influence of the spring 80.

After the drive apparatus has been installed and connected to the wiper motor 16, the motor should be set to "park" position. With the parts in this position, the key 52 of the arm 54 is inserted part way into the slot 50 in the shaft 38. While the arm is firmly held in this position, the locking sleeve 42 is backed off by means of nut 44 to allow the spring loaded pulleys to rotate relative to each other and to shaft 38 and absorb any slack in the cables. When the cables are taut the arm 54 may be set to its proper "park" position merely by rotating the arm 54 and the shaft 38 since the pulleys are rotatable on the shaft. With the arm held in "park" position the locking sleeve nut 44 may be tightened, and (as shown best in Fig. 2) this operation will clamp the pulleys 64 and 66 between the pressure disk 72 and the inner end 42a of the locking sleeve 42 so that when the wiper motor 16 is operated, the shaft 38 will oscillate causing oscillatory motion of the wiper blades 56. When nut 44 is tight the pulleys 64 and 66 are locked to each other and to shaft 38.

Figure 5:
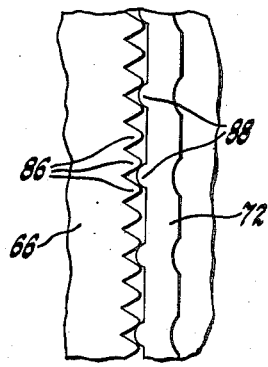
Fig. 5 is an enlarged fragmentary detail view showing the abutting surfaces of the pulley means and the pressure member which provide for adjustment of the wiper blade in small steps.

Fig. 5 shows an enlarged detail view of frictional means provided to insure proper clamping action of the parts and to provide a plurality of fixed steps by means of which the wiper blades may be adjusted accurately to "park" position. The rear face of the pulley 66 bears serrations 86 and the forward face of the pressure disk 72 bears wider spaced serrations 88. If the serrations 86 are spaced two degrees apart around the periphery of pulley 66, a very accurate determination of the proper angular position of the wiper may be made, and fine adjustments may be made to position the wipers on opposite sides of the car at similar angles. By obtaining small increments of adjustment, as, for example, adjustment in steps of two degrees, the wipers can be positioned to "park" properly and to operate symmetrically on opposite ends of the windshield.

While I have shown and described one embodiment of my invention, it is capable of many modifications. Changes, therefore, in the construction and arrangement may be made without departing from the spirit and scope of the inveniton as set forth in the appended claims.

I claim:

1. Windshield wiper apparatus of the character described, including: a windshield wiper arm; an oscillatable shaft; means for mounting said arm nonrotatably on said shaft; a plurality of drive pulleys all rotatably mounted on said shaft; a plurality of cables, one being connected to each of said pulleys; and readily releasable means spaced from said wiper arm in a location to be accessible when said wiper arm is mounted on said shaft for locking said pulleys to said shaft to form a drive connection between said cables and shaft and provide for oscillation of the shaft through the cables.

2. Windshield wiper apparatus of the character described, including: a windshield wiper arm; an oscillatable shaft; means for mounting said arm nonrotatably on said shaft; a plurality of drive pulleys rotatably mounted on said shaft, one of said pulleys having a plurality of radial serrations on one exposed face; a pressure member on said shaft having complementary serrations facing the serrations on said pulley; and readily releasable means for clamping said pulleys and said pressure member together to lock said pulleys to said shaft, said serrations providing for fine adjustment of the angular relation between said pulleys and shaft.

3. Apparatus of the character claimed in claim 2, wherein said serrations are adjacent the periphery of said pulley and are spaced on the order of two degrees from each other.

4. Windshield wiper apparatus of the character described, including: a windshield wiper arm; an oscillatable shaft having a threaded portion; means for mounting said arm nonrotatably on said shaft; a plurality of drive pulleys rotatably mounted on said shaft; and means for clamping said pulleys nonrotatably on said shaft, including a locking sleeve threaded on said shaft and having one end adapted to abut one pulley at one side thereof, and a pressure member on said shaft adapted to abut another pulley at the other side thereof, adjustment of said locking sleeve in one direction relative to the shaft clamping said pulley on said shaft, and adjustment of said locking sleeve in the other direction freeing said pulleys for rotation relative to said shaft.

5. Apparatus of the character claimed in claim 4, wherein the peripheral portions of the abutting surfaces of said pulley means and pressure member are serrated, the serrations on at least one of said members being spaced on the order of two degrees to provide for fine adjustment of the angular relation between said pulleys and shaft.

6. In an automobile having a body and a windshield, windshield wiper apparatus of the character described, including: a windshield wiper arm; an oscillatable shaft extending from inside said body to the outside thereof adjacent said windshield; means for mounting said arm nonrotatably on said shaft outside said body; a plurality of drive pulleys mounted on said shaft inside said body for free rotation relative to said shaft and relative to each other; and means for locking said pulleys to said shaft and to each other, including a locking sleeve threaded on said shaft and having one end adapted to abut one pulley at one side thereof, and a pressure member on said shaft adapted to abut another pulley at the other side thereof, adjustment of said locking sleeve in one direction relative to the shaft clamping said pulleys on said shaft and adjustment of said locking sleeve in the other direction freeing said pulleys for rotation relative to said shaft.

7. Windshield wiper apparatus of the character described, including: a windshield wiper arm; an oscillatable shaft; means for mounting said arm nonrotatably on said shaft; a pair of drive pulleys both rotatably mounted on said shaft; spring means interconnecting said pulleys; and means for clamping said pulleys nonrotatably on said shaft, including a locking sleeve threaded on said shaft and having one end adapted to abut said pulley means at one side thereof, and a pressure member on said shaft adapted to abut said pulleys at the other side thereof, adjustment of said locking sleeve in one direction relative to the shaft clamping said pulleys on said shaft and adjustment of said locking sleeve in the other direction freeing said pulleys for rotation relative to said shaft.

8. Windshield wiper apparatus of the character described, including: a windshield wiper arm; an oscillatable shaft; means for mounting said arm nonrotatably on said shaft; a plurality of drive pulleys mounted on said shaft, all being freely rotatable relative to said shaft and relative to each other; a plurality of cables, one being connected to each of said pulleys; and readily releasable means for locking said pulleys to said shaft and to each other to form a drive connection between said cables and shaft and provide for oscillation of the shaft through the cables.

9. Windshield wiper apparatus of the character described, including: a windshield wiper arm; an oscillatable shaft; means for mounting said arm non-rotatably on said shaft; a pair of drive pulleys both rotatably mounted on said shaft; spring means interconnecting said pulleys; and readily releasable means for locking said pulleys to each other and to said shaft to form a drive connection with the shaft for oscillatably driving the shaft, said spring means being adapted to rotate the pulleys relative to each other and to rotate both pulleys relative to the shaft when the pulleys are unlocked from each other and from the shaft.

References Cited in the file of this patent

UNITED STATES PATENTS

| | | |
|---|---|---|
| 2,125,478 | Whitted | Aug. 2, 1938 |
| 2,137,628 | Sayre | Nov. 22, 1938 |
| 2,202,311 | Folberth | May 28, 1940 |
| 2,538,344 | Wahlberg | Jan. 16, 1951 |
| 2,661,492 | Oishei | Dec. 8, 1953 |